March 4, 1969   W. T. CLARK III   3,431,044
DIMINUTIVE MECHANICAL METHOD OF CHANGING
COLOR AND COLOR SATURATION
Filed Jan. 4, 1965
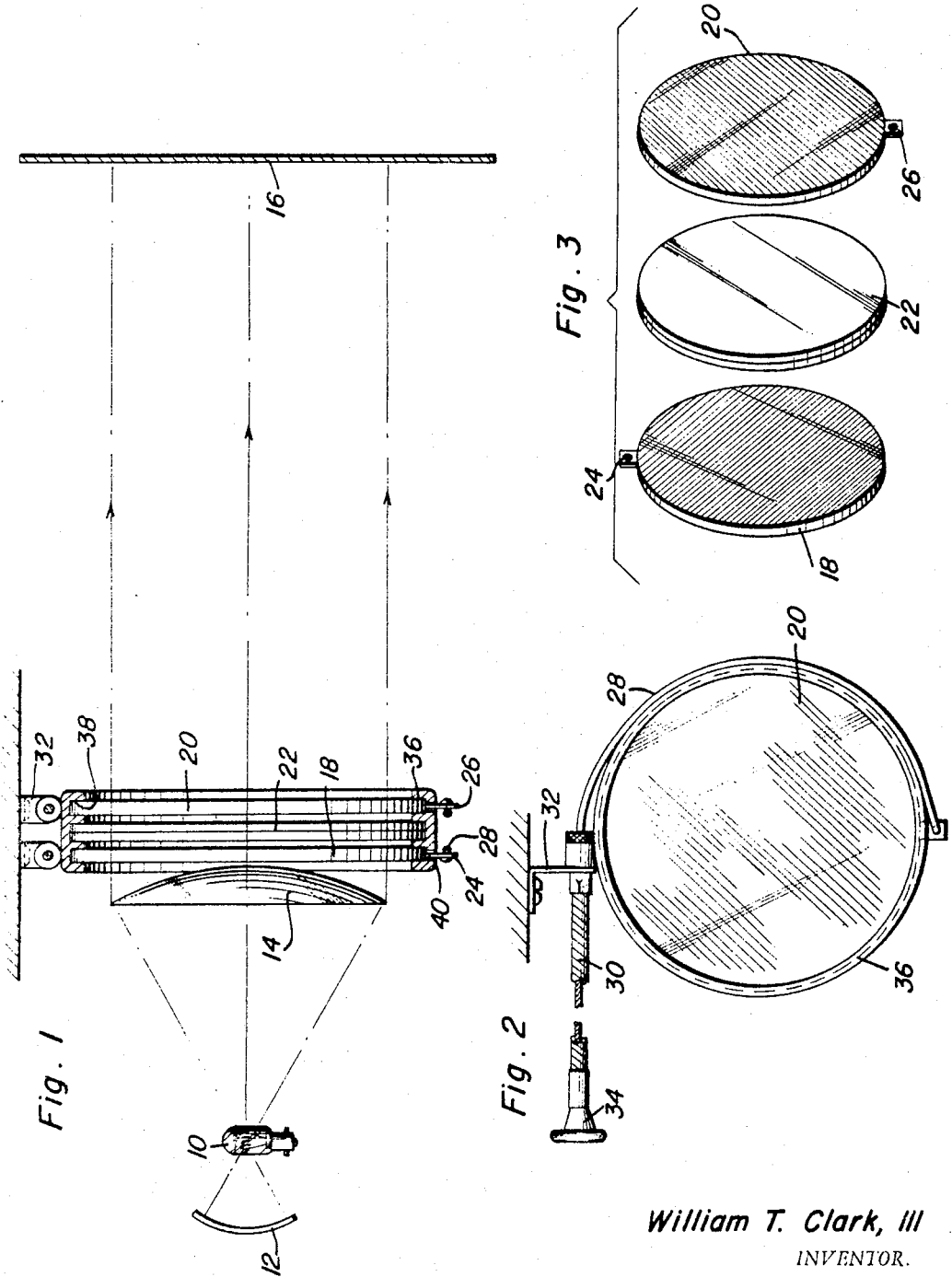
William T. Clark, III
INVENTOR.

3,431,044
DIMINUTIVE MECHANICAL METHOD OF CHANGING COLOR AND COLOR SATURATION
William T. Clark III, Alexandria, La.
(Box 63, 31 McAlister Drive, New Orleans, La. 70118)
Filed Jan. 4, 1965, Ser. No. 422,900
U.S. Cl. 350—158                                  4 Claims
Int. Cl. G02c 1/24

ABSTRACT OF THE DISCLOSURE

A relatively simple mechanical apparatus and method for producing various colors and color saturation from a light source consist of a first polarizing element and a multiple refractive element, relatively rotatable with one another, and a second polarizing element relatively rotatable with both said first polarizing element and said multiple refractive element.

---

The present invention relates to a method and diminutive mechanical structure for changing color and various color saturations of light which passes through the device.

In many fields of endeavor, it is necessary to provide various colors of illumination from a light source and at the same time provide various color saturations. For example, in the field of theatrical lighting, it is necessary to produce various colored ilumination and to vary the saturation of the various colors. This is presently accomplished by rather complex machinery requiring the services of a skilled operator to produce the necessary combination of components to provide a desired color and also to provide a desired color saturation. Generally a light source is provided together with a plurality of solenoid operated color panels which may be selectively orientated in front of the light source together with filter assemblies for varying the color saturation of the color with which the stage or the like is illuminated. In such equipment, there may be as many as several hundred panels of various colors and shades all of which must be operated by a skilled operator when required.

In comparison with the rather complex and large heavy structure, the present invention is quite small in size or diminutive and basically includes a simple mechanical apparatus and method for producing various colors from a light source and various color saturation.

In addition to the field of theatrical lighting, other related fields will make optimum use of the invention such as in television sets, studio lighting, photography, commercial displays and also in television transmission and reception and in any other situation where a variety of colors and color saturation must be achieved from a light source.

Basically, the present invention includes a light source that passes through a first polarizing panel and then through a panel of double refractive material and subsequently through a second panel of polarizing material. As the light planes are changed by the polarizing material in relation to each other and to the double refractive material, a variety of color and color saturations will be produced thereby producing a device by which various colors and color saturations may be obtained at the discretion of an operator by rotating the polarizing panels in relation to each other and in relation to the double refractive material. By controlling selectively the rotation of the first and second polarizing panels, an operator may easily attain any color and any saturation of that color with the second polarizing panel, that is, on the output side of the double refractive material controlling the color saturation while the first polarizing panel, that is, on the input side of the double refractice material controlling the color.

The rotational relationship between the first polarizing panel and the panel of double refractive material may be varied, that is, the double refractive material may be rotated and the first polarizing panel is stationary which also will change the color. However, the rotation of the second polarizing panel, that is, the one on the output side of the double refractive material is necessary for changing color saturation of the various colors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic view illustrating a simple mechanical structure for carrying out the principles of the present invention;

FIGURE 2 is an elevational view illustrating the structure for rotating one of the polarizing panels; and FIGURE 3 is an exploded perspective view illustrating the relationship of the polarizing panels and the double refractive material.

Referring now specifically to the drawings, a light source 10 is illustrated in association with a reflector 12 and a lens 14 all of conventional construction and may be a device normally used in theatrical lighting or the like to illuminate a theater stage area 16 or any other suitable area or theatrical situation.

Orientated in the light path is a first panel of polarizing material 18 hereinafter called the first polarizing panel. Spaced from the first polarizing panel 18 is a second panel 20 of polarizing material hereinafter called the second polarizing panel. Interposed between the first and second polarizing panels 18 and 20 is a panel of double or multiple refractive material 22 which as illustrated is double refractice material and all of the panels 18, 20, and 22 are substantially of the same diameter so that all of the light from the light source 10 will pass therethrough.

The first polarizing panel 18 is provided with a tab 24 and the second polarizing panel 20 is provided with a tab 26. The tabs 24 and 26 are respectively adapted to be connected to elongaed flexible wires or cables 28 which are received in a flexible coil wire guide tube 30 carried by a suitable supporting bracket 32. The flexible wire 28 has a button-type handle 34 on the end thereof whereby pulling and pushing on the handle 34 will cause linear movement of guide wire 28 in the guide cable 30 for causing rotation of the panels 18 or 20 depending upon which knob handle 34 is operated. As illustrated, the guide cable 30 is generally tangential to the periphery of the polarizing panel in diametrically opposed relation to the position of the tab to which the flexible wire 28 is attached thus causing rotation of the polarizing panel about a central axis.

The panels 18, 20 and 22 are journalled in an annular support member 36 having a plurality of channel-shaped trackways 38 therein which rotatably retain the panel. Partial peripheral slots 40 are provided in the periphery of the channel-shaped guide 38 for receiving the tabs 24 and 26 respectively for rotating the polarizing panels.

It is pointed out that other manual, mechanical, electrical or electronic devices may be provided for varying the positional relationship of the polarizing panels about a central axis. Also, suitable manual, mechanical, electrical or electronic devices may be used to vary the mechanical or optical characteristics of the single or multiple layers of the double refractive material as well as the polarizing panels. The structure as illustrated in merely representative of a simple mechanical structure for accomplishing the desired purpose and illustrating the basic principles of this invention.

The principle of changing color by using a polarizing panel and a refractive material panel is known and the significant factor in the present invention resides in the use of the second polarizing panel 20 on the output side of the refractive material panel for the purpose of infinitely varying the saturation of the particular color produced by the assembly. Thus, by varying the relative position of the first polarizing panel and the refractive material panel and then varying the position of the second polarizing panel, and infinite variety of colors and various color saturations may be obtained for illuminating a theatrical stage or the like. The structure of the present invention will be extremely simple, lightweight and easily operable from a central control station and will eliminate the use of rather complex structures presently being employed for theatrical lighting such as kleig lights and the like. Many other uses of the present invention may develop such as in television, photography, commercial display and the like with one particular use residing in color television reception in which a black and white receiver may be easily employed with the present invention for producing a color picture having an infinite variety of color and various color saturations having sharp definition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for producing various colors and color saturations from a light source comprising a first polarizing panel receiving light from a light source, a multiple refractive panel disposed on the output side of the first polarizing panel, which multiple refracting panel, in combination with the first polarizing panel, is capable of producing more than a single color and its complementary, means for altering the relative rotative relation between the first polarizing panel and the multiple refractive panel, a second polarizing panel on the output side of the refractive panel, and means for altering the relative rotative position of the second polarizing panel in relation to the other panels for producing more than two colors and color saturations from the light source.

2. The structure as defined in claim 1 wherein said refractive panel is in the form of a bi-refringent material.

3. The method of producing various colors and color saturations from a single light source consisting of the steps of passing the light from the light source successively through a first polarizing panel, a multiple refractive panel characterized by its ability to produce more than one color and its complementary from the light passing through it and the first polarizing panel, and a second polarizing panel, varying the relative rotative relation between the plane of polarized light passing through the first polarizing panel and the light passing through the multiple refractive panel for producing various colors, and varying the relative rotative relation between the plane of polarized light passing through the second polarizing panel with respect to the first polarizing panel and the multiple refractive panel for varying the color saturation of the color.

4. A device for producing various colors and color saturations consisting of,
   a first planar panel formed of polarizing material for receiving light from a light source disposed on one side thereof,
   a second planar panel formed of multiple refractive material disposed on the other side of the first panel,
   the multiple refractive material of which said second planar panel is formed being characterized by its ability to produce more than one color and its complementary when said first two panels are rotated relative to one another,
   a third planar panel formed of polarizing material disposed on that side of the second panel which is remote from the first panel,
   means for rotating one of the first two panels in its plane, and
   means for rotating the third panel in its plane.

References Cited

UNITED STATES PATENTS

| | | | |
|---|---|---|---|
| 1,885,642 | 11/1932 | Strong | 350—158 X |
| 2,263,684 | 11/1941 | Ryan | 350—148 X |
| 2,298,058 | 10/1942 | Land | 350—159 X |
| 2,380,481 | 7/1945 | Tillyen et al. | 350—156 X |
| 2,383,186 | 8/1945 | Glasser | 350—159 X |
| 2,473,857 | 6/1949 | Burchell | 350—158 X |
| 2,527,593 | 10/1950 | Stadler | 350—158 |
| 2,651,971 | 9/1953 | Rösch | 350—158 |

DAVID SCHONBERG, *Primary Examiner.*

PAUL R. MILLER, *Assistant Examiner.*

U.S. Cl. X.R.

350—147, 148, 157, 159